US005605077A

United States Patent [19]

Tsunoda et al.

[11] Patent Number: 5,605,077

[45] Date of Patent: Feb. 25, 1997

[54] CAMSHAFT SUPPORTING STRUCTURE IN AN ENGINE

[75] Inventors: Masaki Tsunoda; Mitsuharu Tanaka, both of Wako, Japan

[73] Assignee: Honda Giken Kogyo Kabushiki Kaisha, Tokyo, Japan

[21] Appl. No.: 536,392

[22] Filed: Sep. 29, 1995

[30] Foreign Application Priority Data

Sep. 30, 1994 [JP] Japan .................................... 6-236639

[51] Int. Cl.[6] ............................ F16H 53/00; F01L 13/00

[52] U.S. Cl. ......................... 74/567; 123/90.17; 123/90.6

[58] Field of Search ................................ 74/567, 568 R; 123/90.15–90.18, 90.6

[56] References Cited

U.S. PATENT DOCUMENTS

| | | | |
|---|---|---|---|
| Re. 33,783 | 1/1992 | Yoshikawa | 123/90.27 X |
| 4,681,069 | 7/1987 | Honma | 123/90.27 |
| 4,878,462 | 11/1989 | Kurisu et al. | 123/90.17 |
| 4,915,067 | 4/1990 | Imajo | 123/90.34 |
| 5,359,970 | 11/1994 | Krebs | 123/90.17 |
| 5,471,895 | 12/1995 | Ohmon et al. | 74/567 |
| 5,497,679 | 3/1996 | Mitchell et al. | 123/90.6 X |
| 5,497,735 | 3/1996 | Kern et al. | 123/90.6 |

FOREIGN PATENT DOCUMENTS

| | | | |
|---|---|---|---|
| 55-96310 | 7/1980 | Japan | 123/90.6 |
| 2202001 | 9/1988 | United Kingdom | 123/90.6 |

*Primary Examiner*—Vinh T. Luong
*Attorney, Agent, or Firm*—Nikaido, Marmelstein, Murray & Oram LLP

[57] ABSTRACT

A camshaft includes a first end journal portion and first, second and third intermediate journal portions respectively. The first end journal portion is supported in a bearing hole in an upper end wall of the cylinder head. The first, second and third intermediate journal portions are supported in three bearing holes in the three intermediate bearing bosses in the cylinder head, respectively. The radii of the four bearing holes and of a camshaft inserting opening in a lower end wall of the cylinder head are in a relationship such that the camshaft inserting opening is the largest radii, and each adjacent bearing hole is progressively smaller in size. The smallest radii bearing hole is for the bearing hole for the first end journal portion. The largest radius of an intake cam and an exhaust cam is smaller than the radii of the intermediate bearing holes. Thus, the camshaft can be smoothly inserted through the camshaft inserting opening and hence, can be easily assembled into the cylinder head.

2 Claims, 6 Drawing Sheets

CAMSHAFT SUPPORTING STRUCTURE IN AN ENGINE

BACKGROUND OF THE INVENTION

1. Field of the Invention

The present invention relates to a camshaft supporting structure in an engine for supporting a camshaft having a plurality of valve operating cams and a plurality of journal portions on intermediate bearing portions formed in a cylinder head.

2. Description of the Prior Art

When a camshaft is supported in a cam chamber provided in a cylinder head of an engine, if the camshaft has a short overall length, such as a camshaft for a single-cylinder engine or a 2-cylinder engine, opposite ends of the camshaft can be supported in a sidewall of a cylinder head. When a camshaft has a long overall length, however, if opposite ends thereof are only supported, such as a camshaft of a large-size engine such as a 3- or more-cylinder engine, the camshaft may be flexed. For this reason, a journal portion formed at an intermediate portion of the camshaft is supported on an intermediate bearing means provided in the cylinder head.

The intermediate bearing means comprises an intermediate bearing boss integrally formed in the cylinder head and a bearing cap coupled to the intermediate bearing boss by a bolt, so that the journal portion of the camshaft is clamped between the intermediate bearing boss and the bearing cap, or comprises a bearing hole defined in an intermediate bearing boss integrally formed on the cylinder head, so that the journal portion may be fitted into the bearing hole.

In the former case, the bearing cap and the bolt are required, resulting in an increased number of components, but in the latter case, the bearing cap and the bolt are not required, resulting in a decreased number of components. In the latter case, however, the following problem is encountered: in inserting the camshaft into the bearing hole in the intermediate bearing boss, the valve operating cam interferes with the bearing hole having a diameter smaller than the largest diameter of the valve operating cam. For this reason, a notch for permitting the valve operating cam to pass therethrough must be formed in the bearing hole, and the camshaft must be inserted while being rotated to align the phase of the valve operating cam with the phase of the notch, resulting in a slow assembly rate.

SUMMARY OF THE INVENTION

Accordingly, it is an object of the present invention to provide a camshaft supporting structure in an engine, wherein the assembling of the camshaft into the cylinder head can be easily performed.

To achieve the above object, according to a first aspect and feature of the present invention, there is provided a camshaft supporting structure in an engine, comprising, a camshaft inserting opening and a plurality of intermediate bearing bosses which are formed in a cylinder head. Bearing holes are defined in the intermediate bearing bosses. A camshaft has a plurality of valve operating cams and a plurality of journal portions. The plurality of journal portions are rotatably supported in the bearing holes by inserting the camshaft through the camshaft inserting opening. A radius of each of the bearing holes is larger than the largest radius of the valve operating cams. The radii of the bearing holes are progressively smaller in sequence from the side closer to the camshaft inserting opening to the side farthest from the camshaft inserting opening.

With the first feature of the present invention, the radius of each of the bearing holes is larger than the largest radius of the valve operating cam and therefore, even if the phases of the bearing hole and the valve operating cam are aligned with each other, the valve operating cam cannot interfere with each of the bearing holes. In addition, the radii of the bearing holes are progressively smaller in sequence from the one closest to the camshaft inserting opening to the one furthest from the camshaft inserting opening and therefore, the interference of the journal portions with the bearing holes can be avoided and thus, the camshaft can be smoothly inserted, thereby substantially enhancing the assembling of the camshaft.

According to a second aspect and feature of the present invention, in addition to the first feature, each of the intermediate bearing bosses has a bearing hole for supporting the camshaft therein, and bearing holes for supporting rocker arm shafts have a diameter smaller than that of the camshaft. The thickness of the intermediate bearing boss in a vicinity of the bearing holes for supporting the rocker arm shafts is set larger than the thickness of the intermediate bearing boss in a vicinity of the bearing hole for supporting the camshaft.

With the second feature of the present invention, it is possible to insure a sufficient supporting area for the rocker arm shaft of the smallest diameter, and also to prevent the supporting area for the camshaft of the largest diameter from becoming excessive.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
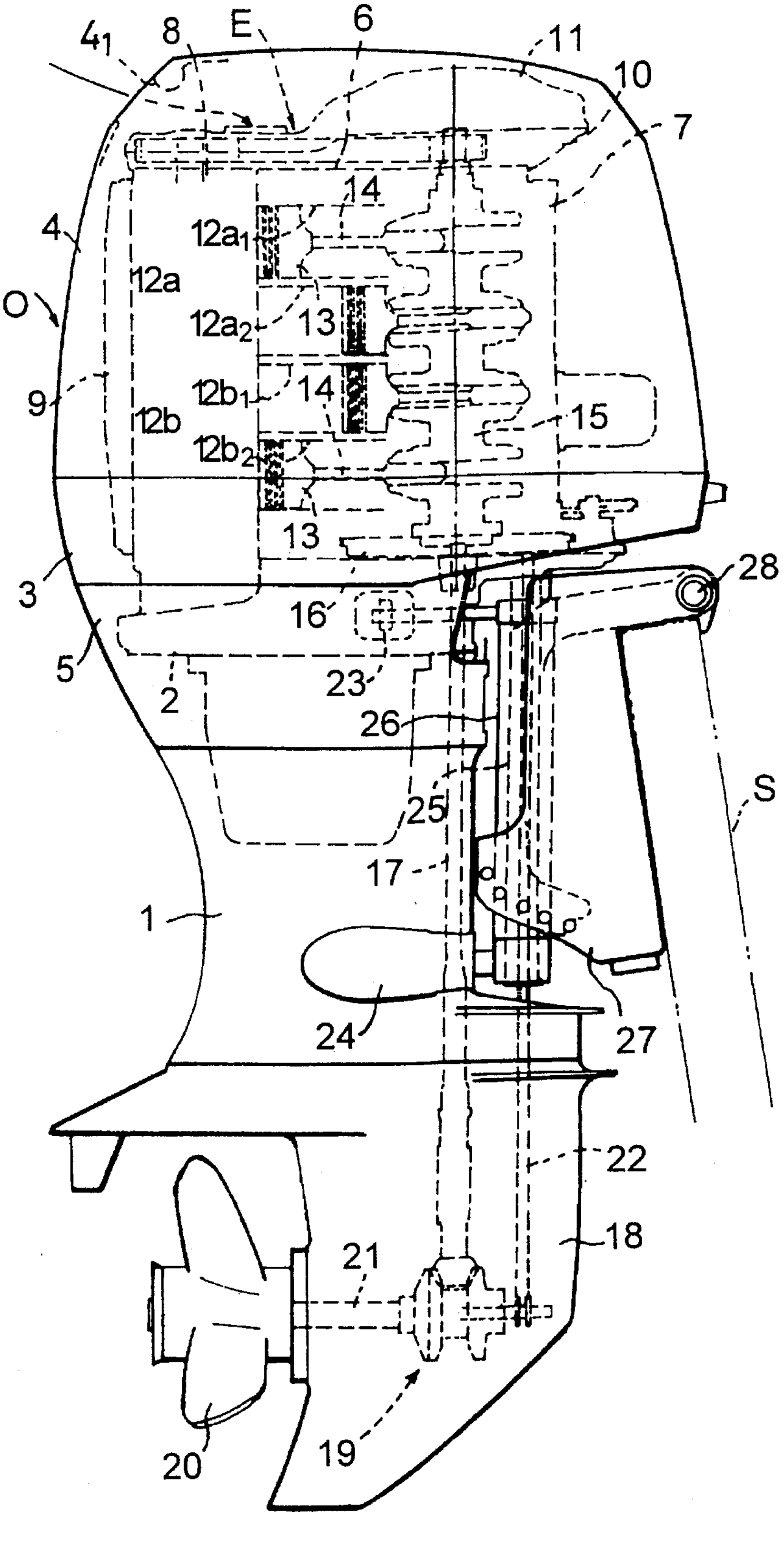
FIG. 1 is a side view of the entire outboard engine system incorporating a camshaft supporting structure according to an embodiment of the present invention.
Figure 2:
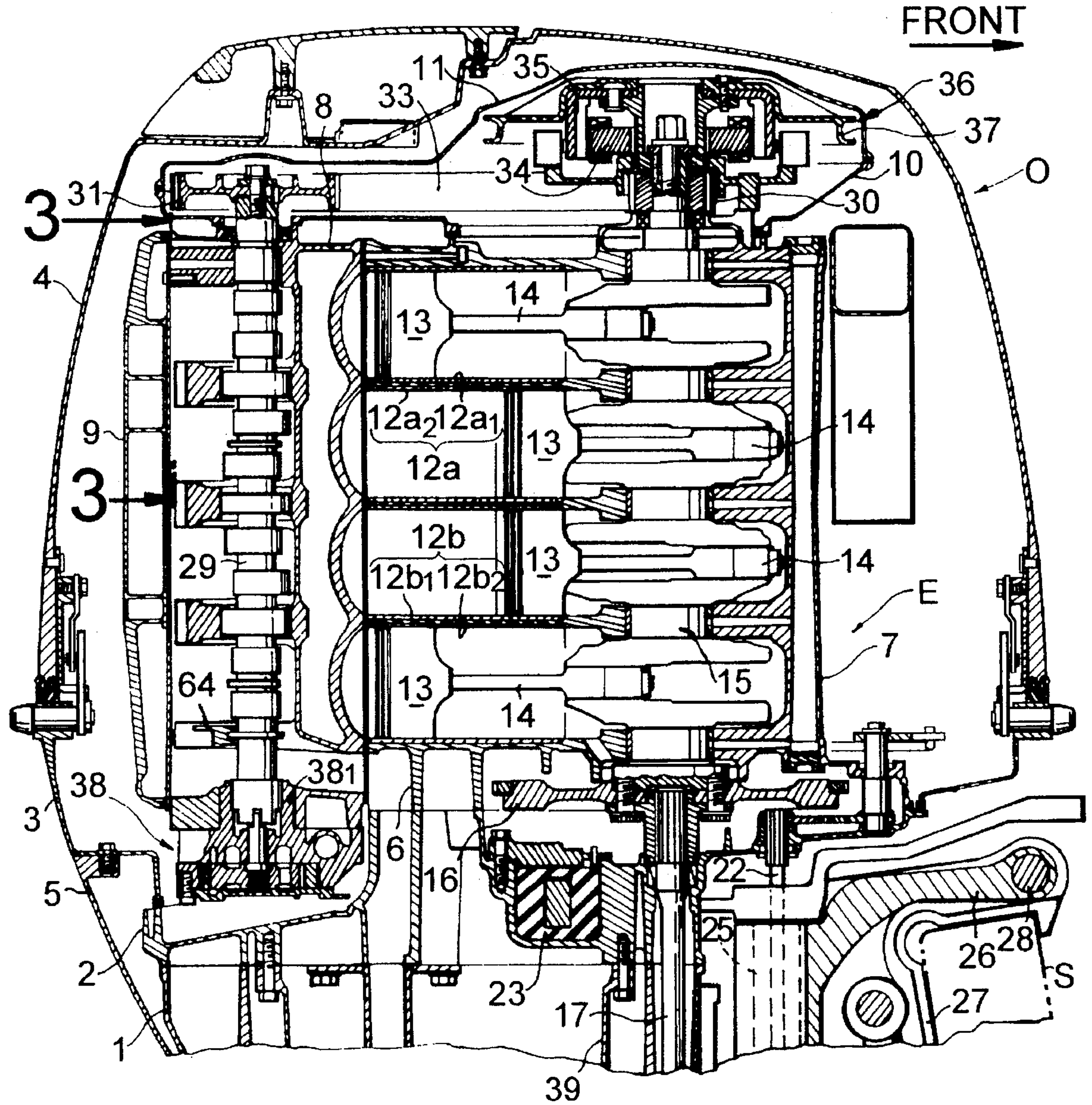
FIG. 2 is an enlarged sectional view of an essential portion shown in FIG. 1.

Referring to FIGS. 1 and 2, an outboard engine system O includes a mount case 2 coupled to an upper portion of an extension case 1. A serial 4-cylinder and 4-cycle engine E is supported on an upper surface of the mount case 2. An under-case 3 having an open upper surface is coupled to the mount case 2. An engine cover 4 is detachably mounted on an upper portion of the under-case 3. An under-cover 5 is mounted between a lower edge of the under-case 3 and an upper edge of the extension case 1 to cover an outside of the mount case 2. Air is drawn through an air intake bore $4_1$ defined in an upper portion of the engine cover 4.

The engine E includes a cylinder block 6, a crankcase 7, a cylinder head 8, a head cover 9, a lower belt cover and an upper belt cover 11. The cylinder block 6 and the crankcase 7 are supported on the upper surface of the mount case 2. Pistons 13 are slidably received respectively in four cylinders $12a_1$, $12a_2$, $12b_1$ and $12b_2$ which are defined in the cylinder block 6. The pistons are connected through connecting rods 14 to a crankshaft 15 which is vertically disposed.

A driving shaft 17 is connected to a lower end of the crankshaft 15 along with a flywheel 16. The driving shaft extends downwardly within the extension case 1. A lower end of the driving shaft 17 is connected to a propeller shaft 21 having a propeller 20 mounted to its rear end through a bevel gear mechanism 19 which is mounted within a gear case 18. A lower end of a shift rod 22 is connected to a front portion of the bevel gear mechanism 19 in order to change the direction of rotation of the propeller shaft 21.

A single camshaft 29, parallel to the crankshaft 15, is rotatably supported in the cylinder head 8. A timing belt 33 is reeved over a crank pulley 30 mounted at an upper end of the crankshaft 15. A cam pulley 31 is mounted at an upper end of the camshaft 29. An electric generator 36, including a stator 34 and a rotor 35, is mounted above the crank pulley. A starting pulley 37, for manually starting the engine, is mounted at an upper portion of the electric generator 36. The cam pulley 31, the timing belt 33, the electric generator 36 and the starting pulley 37 are accommodated within the lower and upper belt covers 10 and 11. An oil pump 38, for pumping an oil from an oil pan 39, is mounted at a lower end of the camshaft 29.

A swivel shaft 25 is fixed between an upper mount 23 provided in the mount case 2 and a lower mount 24 provided in the extension case 1. A swivel case 26, for rotatably supporting the swivel shaft 25, is vertically swingably supported on a stern bracket 27 mounted at a stern S through a tilting shaft 28.

The camshaft 29 which is supported in the cylinder head 8 and the structure of supporting the camshaft 29 will be described with reference to FIGS. 3 to 7.

As can be seen from FIGS. 3 to 6, the cylinder head 8 includes a) a cylinder block-coupled surface 41 coupled to the cylinder block 6, and b) a head cover-coupled surface 42 coupled to the head cover 9. Four combustion chambers 43 are defined on the side of the cylinder block-coupled surface 41. A valve operating chamber 44 is defined on the side of the head cover-coupled surface 42.

Defined in an upper end wall 45 of the cylinder head 8 are a bearing hole $45_1$ for supporting the upper end of the camshaft 29 therein, a bearing hole $45_2$ for supporting the upper end of the intake rocker arm shaft 46 therein, and a bearing hole $45_3$ for supporting the upper end of the exhaust rocker arm shaft 47 therein. On the other hand, defined in a lower end wall 48 of the cylinder head 8 are a camshaft inserting opening $48_1$ through which the camshaft 29 is inserted during assembling, a bearing hole $48_2$ for supporting the lower end of the intake rocker arm shaft 46 therein, and a bearing hole $48_3$ for supporting the lower end of the exhaust rocker arm shaft 47 therein. In a condition in which the camshaft 29 has been assembled, a pump housing $38_1$ of the oil pump 38 is fitted into the camshaft inserting opening $48_1$.

Three intermediate bearing bosses 49, 50 and 51 are integrally provided in the cylinder head 8 to protrude into the valve operating chamber 44. Defined respectively in the intermediate bearing bosses 49, 50 and 51 are bearing holes $49_1$, $50_1$ and $51_1$ for supporting intermediate portions of the camshaft 29 therein, bearing holes $49_2$, $50_2$ and $51_2$ for supporting intermediate portions of the intake rocker arm shaft 46 therein, and bearing holes $49_3$, $50_3$ and $51_3$ for supporting intermediate portions of the exhaust rocker arm shaft 47 therein. The intake and exhaust rocker arm shafts 46 and 47 are non-rotatably fixed. The bearing holes $51_2$ and $51_3$ of the intermediate bearing boss 51 are not shown.

Figure 5:
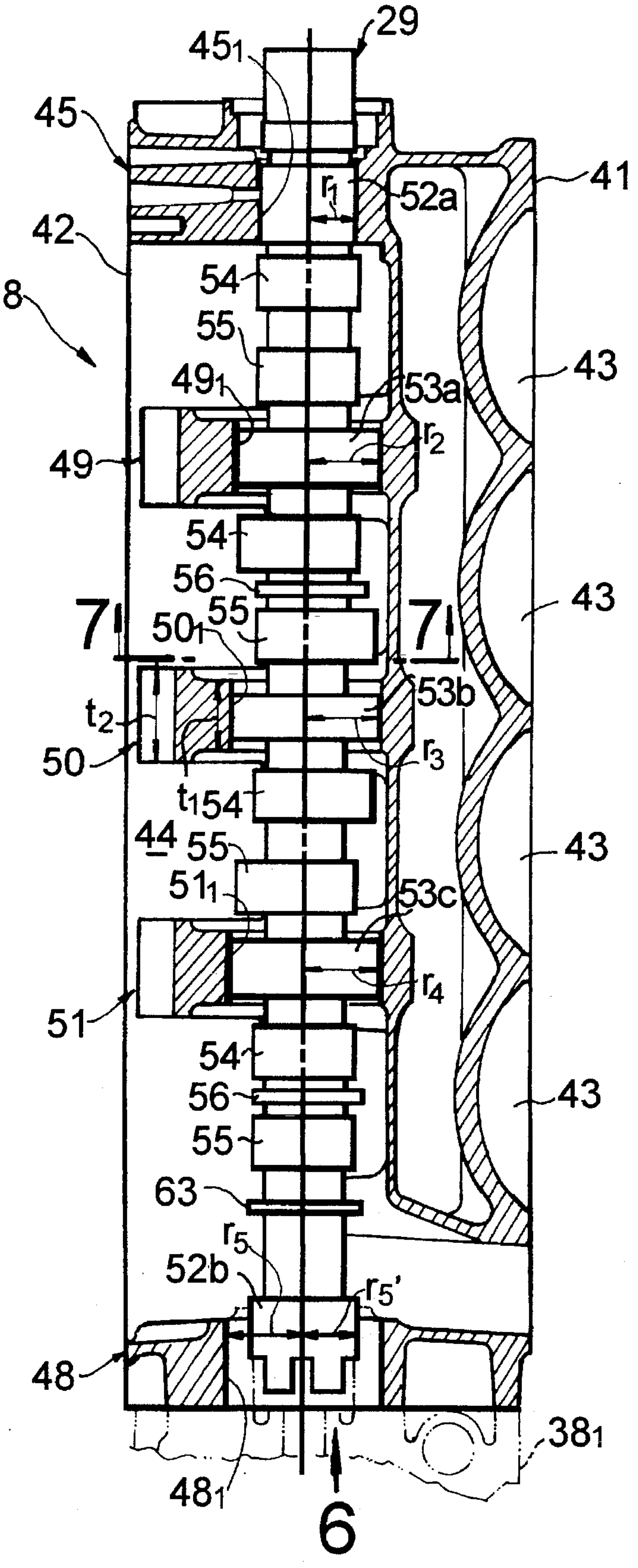
FIG. 5 is an enlarged view of an essential portion shown in FIG. 2.
Figure 6:
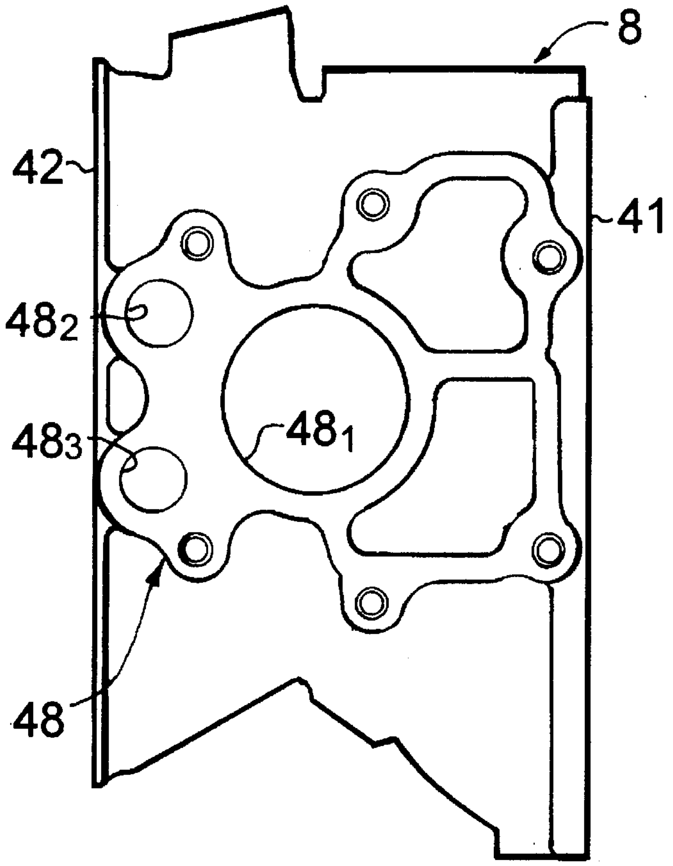
FIG. 6 is a sectional view taken along a line 6—6 in FIG. 5.
Figure 7:
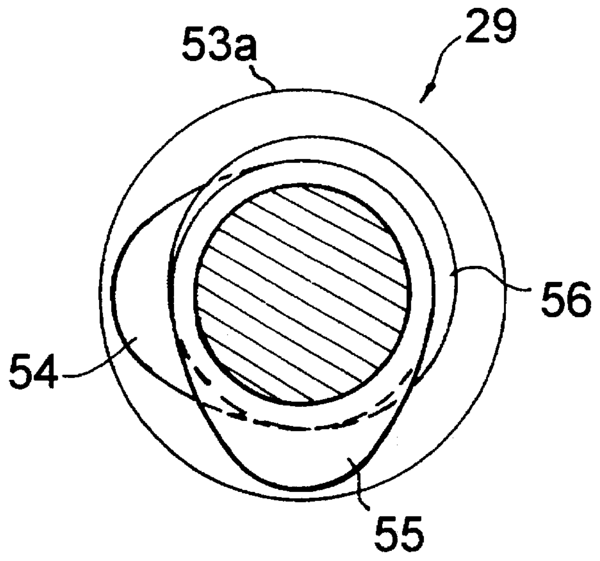
FIG. 7 is a view taken in a direction of an arrow 7 in FIG. 5.

As can be seen from FIG. 5, the camshaft 29 includes a first end journal portion 52*a* which is fitted into the bearing hole $45_1$ in the upper end wall 45, and a second end journal portion 52*b* which is fitted into the camshaft inserting opening $48_1$ in the lower end wall 48, as well as first, second and third intermediate journal portions 53*a*, 53*b*, 53*c* which are fitted into the bearing holes $49_1$, $50_1$ and $51_1$ in the intermediate bearing bosses 49, 50 and 51. The camshaft 29 further includes a flange 63 in the vicinity of its lower end, so that the camshaft 29 is axially positioned by bringing the flange 63 into engagement with an engage member 64 (see FIG. 2) coupled to the cylinder head 8 by a bolt.

The camshaft 29 includes four intake cams 54 and four exhaust cams 55 in correspondence to the cylinders $12a_1$, $12a_2$, $12b_1$ and $12b_2$, as well as fuel pump driving cams 56, 56 located between the intake and exhaust cams 54 and 55 for the cylinder $12a_2$ and between the intake and exhaust cams 54 and 55 for the cylinder $12b_2$, respectively.

Figure 3:
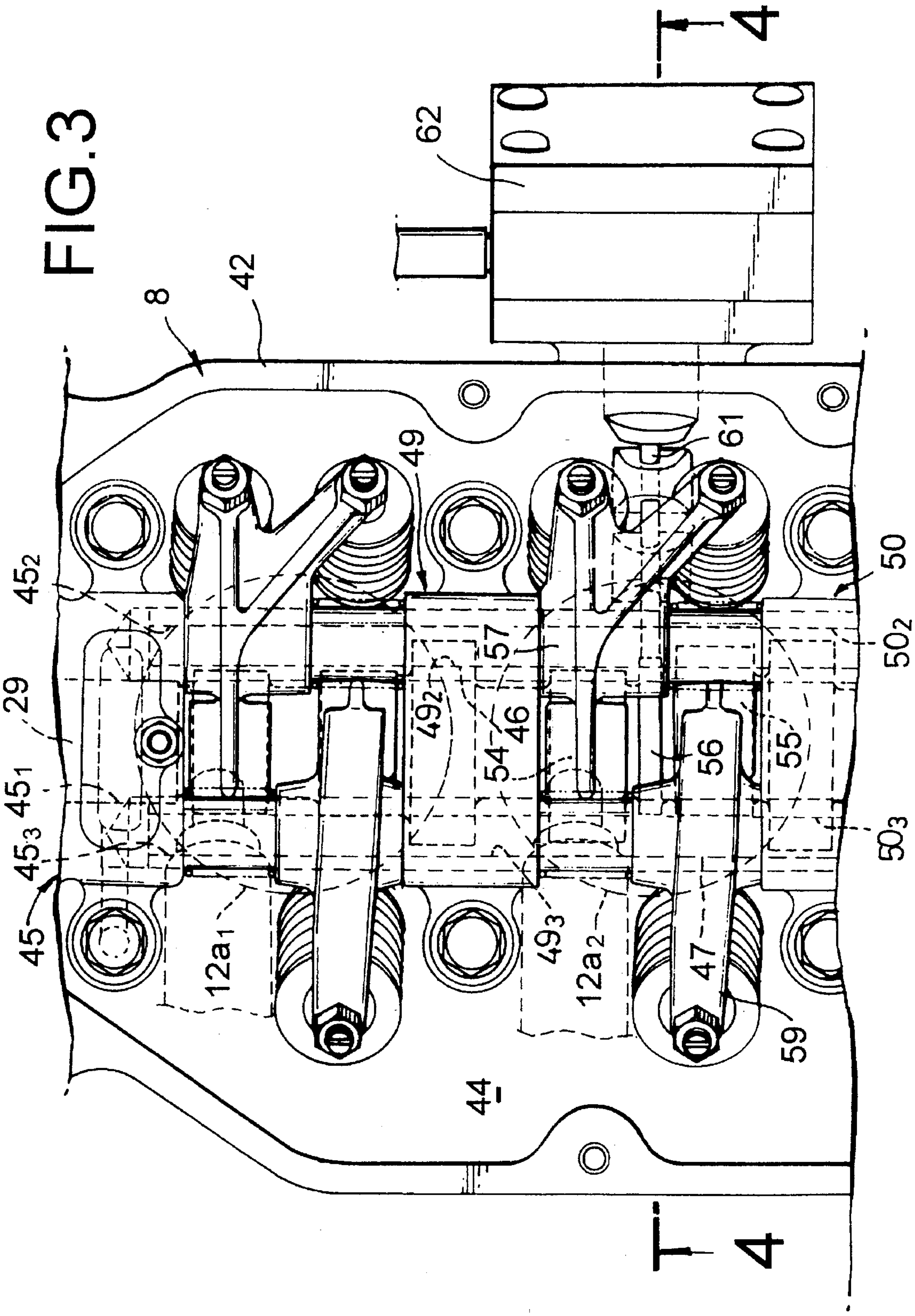
FIG. 3 is an enlarged sectional view taken along a line 3—3 in FIG. 2.
Figure 4:
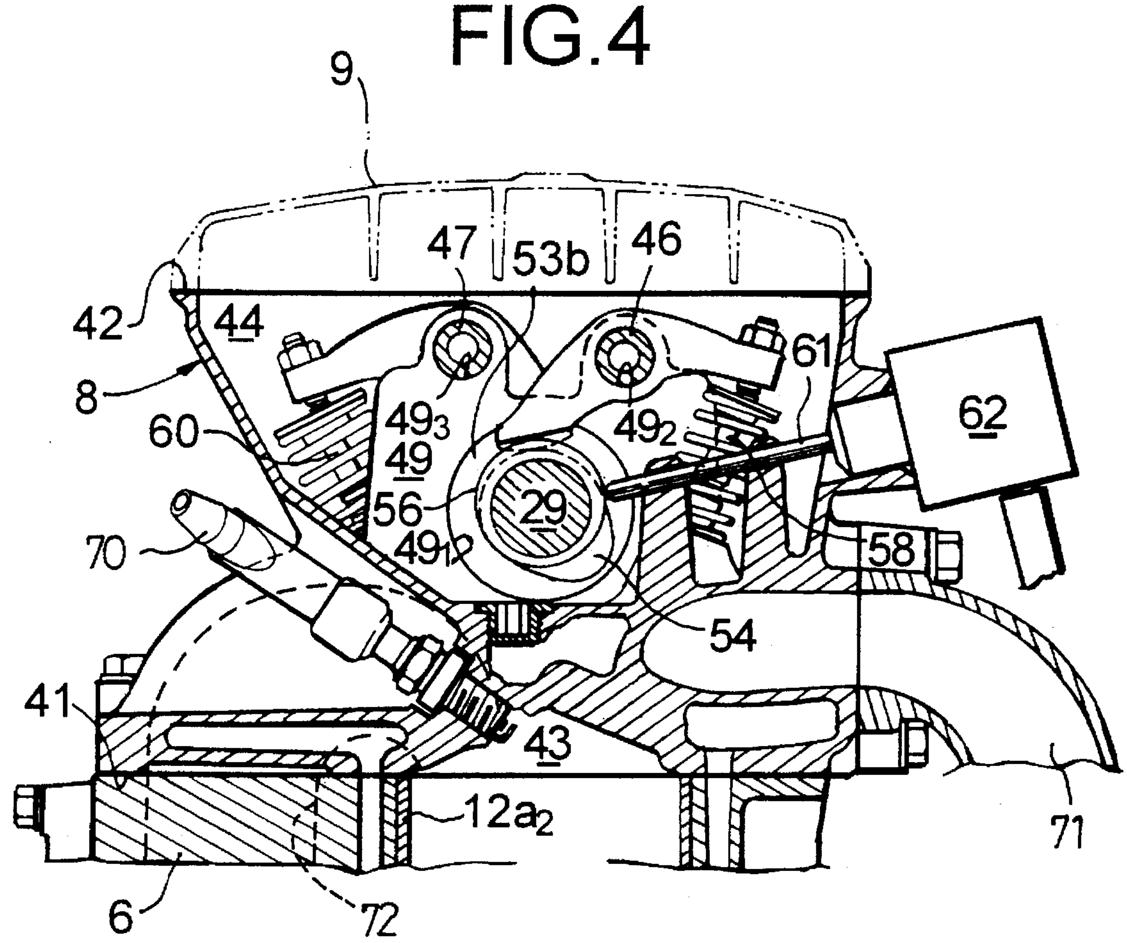
FIG. 4 is a sectional view taken along a line 4—4 in FIG. 3.

As can be seen from FIGS. 3 and 4, intake rocker arms 57 are pivotally supported on the intake rocker arm shaft 46 to abut against two intake valves 58 which are mounted for each of the intake cams 54 and each of the cylinders $12a_1$, $12a_2$, $12b_1$ and $12b_2$. In FIG. 4, reference numerals 70, 71 and 72 are spark plug, intake passage and exhaust passage, respectively. Exhaust rocker arms 59 are pivotally supported on the exhaust rocker arm shaft 47 to abut against one exhaust valve 60 which is mounted for each of the exhaust cams 55 and each of the cylinders $12a_1$, $12a_2$, $12b_1$ and $12b_2$.

Pump driving rods 61, 61 are mounted to abut against the two pump driving cams 56, 56 and are connected to two fuel pumps 62, 62 provided in a sidewall of the cylinder head 8. Thus, the fuel pumps 62, 62 are driven by the camshaft 29.

The radii $r_1$, $r_2$, $r_3$ and $r_4$ of the four bearing holes $45_1$, $49_1$, $50_1$ and $51_1$ for supporting the camshaft 29 therein are such that the radius $r_1$ of the bearing hole $45_1$ of these bearing holes which is provided in the upper end wall 45 and farthest from the camshaft inserting opening $48_1$ in the lower end wall 48 of the cylinder head 8 is smallest. The radii $r_2$, $r_3$ and $r_4$ of the bearing holes $49_1$, $50_1$ and $51_1$ in the intermediate bearing bosses 49, 50 and 51 are sequentially larger than a previous bearing hole the closer they are to the lower end wall 48. The radius $r_5$ of the camshaft inserting opening $48_1$ in the lower end wall 48 is larger than the radius $r_4$ of the bearing hole $51_1$ in the intermediate bearing boss 51. Thus, a relation, $r_1<r_2<r_3<r_4<r_5$ is established.

The radii of the first end journal portions 52*a* and the first, second and third intermediate journal portions 53*a*, 53*b* and 53*c* of the camshaft 29 fitted in the four bearing holes $45_1$, $49_1$, $50_1$ and $51_1$ are equal to the radii of the bearing holes $45_1$, $49_1$, $50_1$ and $51_1$ in which these journal portions are fitted, i.e., to $r_1$, $r_2$, $r_3$ and $r_4$. In addition, the diameter $r_5'$ of the second end journal portion 52*b* of the camshaft 29 is smaller than the radius $r_5$ of the camshaft inserting opening $48_1$, because the pump housing $38_1$ is interposed between the second end journal portion 52$b$ and an inner periphery of the camshaft inserting opening 48$_1$ in the lower end wall 48.

Differences between the radii $r_2$, $r_3$ and $r_4$ of the bearing holes 49$_1$, 50$_1$ and 51$_1$ in the intermediate bearing bosses 49, 50 and 51 are about 0.5 mm. The largest one of the radii of the intake cams 54, the exhaust cams 55 and the fuel pump driving cams 56 is set smaller than the smallest radii $r_2$ of the these radii $r_2$, $r_3$ and $r_4$ which is for the bearing hole 49$_1$ in the intermediate bearing boss 49 (see FIG. 5).

When the camshaft 29 is inserted through the camshaft inserting opening 48$_1$ in the lower end wall 48 to assemble the camshaft 29 into the cylinder head 8, any of the intake cams 54, the exhaust cams 55 and the fuel pump driving cams 56 cannot interfere with the camshaft inserting opening 48$_1$ and the bearing holes 49$_1$, 50$_1$ and 51$_1$ in the intermediate bearing bosses 49, 50 and 51. The first end journal portions 52$a$ and the first, second and third intermediate journal portions 53$a$, 53$b$ and 53$c$ of the camshaft 29 are fitted into the bearing hole 45$_1$ in the upper end wall 45 and the bearing holes 49$_1$, 50$_1$ and 51$_1$ in the intermediate bearing bosses 49, 50 and 51, respectively.

In addition, when the first intermediate journal portion 53$a$ passes through the camshaft inserting opening 48$_1$ and the bearing holes 50$_1$ and 51$_1$, when the second intermediate journal portion 53$b$ passes through the camshaft inserting opening 48$_1$ and the bearing hole 51$_1$ and further when the second intermediate journal portion 53$c$ passes through the camshaft inserting opening 48$_1$, the generation of any interference is avoided, because the camshaft inserting opening 48$_1$ has the largest radius, and the radii of the bearing holes 49$_1$, 50$_1$ and 51$_1$ in the intermediate bearing bosses 49, 50 and 51 are smaller and smaller in sequence from the side closer to the camshaft inserting opening 48$_1$. In this manner, the camshaft 29 can be smoothly inserted.

When the camshaft 29 has been inserted, the pump housing 38$_1$ of the oil pump 38 is fitted between the inner periphery of the camshaft inserting opening 48$_1$ in the lower end wall 48 of the cylinder head 8 and the outer periphery of the second end journal portion 52$b$ of the camshaft 29, thus completing the assembling of the camshaft 29.

As can be seen from FIG. 5, each of the intermediate bearing bosses 49, 50 and 51 has an axial thickness $t_2$ at a portion adjacent its tip end having the bearing holes 49$_2$, 50$_2$, 51$_2$ and 49$_3$, 50$_3$, 51$_3$ defined therein for supporting the intake rocker arm shaft 46 and the exhaust rocker arm shaft 47, which is larger than an axial thickness $t_1$ at a portion adjacent its base end connected to a body of the cylinder head 8. Each of the intermediate bearing bosses 49, 50 and 51 expanded at their tip ends in the above manner can be formed by using a sand core when the cylinder head is produced in a casting process. A lower bore is formed in each of the intermediate bearing bosses 49, 50 and 51 by such a sand core, and each of the bearing holes 49$_1$, 50$_1$ and 51$_1$ is formed by machining such a lower bore. By previously forming the lower bore by the sand core as described above, a material portion which is lost as cutting wastage can be reduced.

Since the bearing holes 49$_2$, 50$_2$, 51$_2$ and 49$_3$, 50$_3$, 51$_3$ for supporting the intake and exhaust rocker arm shafts 46 and 47 are defined at the larger axial thickness ($t_2$) portions of the intermediate bearing bosses 49, 50 and 51, as described above, a sufficient supporting area can be insured even if the intake and exhaust rocker arm shafts 46 and 47 have a small diameter. Conversely, since the bearing holes 49$_1$, 50$_1$ and 51$_1$ for supporting the larger-diameter camshaft 29 are defined at the smaller axial thickness ($t_1$) portions of the intermediate bearing bosses 49, 50 and 51, the supporting area can be prevented from becoming excessive, even if the camshaft 29 is of a large diameter.

Although the embodiment of the present invention has been described in detail, it will be understood that the present invention is not limited to the above-described embodiment, and various modifications in design may be made without departing from the spirit and scope of the invention defined in the claims For example, although the serial 4-cylinder engine E in the outboard engine system has been illustrated in the embodiment, the present invention is applicable to an engine used in a machine other than the outboard engine system O, and also to a 3-cylinder or 5-cylinder engine.

What is claimed is:

1. A camshaft supporting structure in an engine, comprising:

a camshaft inserting opening formed in a cylinder head;

a plurality of intermediate bearing bosses which are formed in said cylinder head;

bearing holes defined in said intermediate bearing bosses; and a camshaft having a plurality of valve operating cams and a plurality of journal portions, said plurality of journal portions being rotatably supported in said bearing holes by inserting said camshaft through said camshaft inserting opening, wherein a radius of each of said bearing holes is larger than a largest radius of said valve operating cams, and radii of the bearing holes are progressively smaller in sequence from a side closer to the camshaft inserting opening to a side farthest from the camshaft inserting opening.

2. A camshaft supporting structure in an engine according to claim 1, wherein each of said intermediate bearing bosses has a) said bearing hole for supporting said camshaft therein, and b) bearing holes for supporting rocker arm shafts having a diameter smaller than that of said camshaft, a thickness of said intermediate bearing boss in a vicinity of said bearing holes for supporting said rocker arm shafts being set larger than a thickness of said intermediate bearing boss in a vicinity of said bearing hole for supporting said camshaft.

* * * * *